US009392569B2

(12) United States Patent
Gustafsson et al.

(10) Patent No.: US 9,392,569 B2
(45) Date of Patent: Jul. 12, 2016

(54) SYSTEMS AND METHODS FOR A LOCATION SERVER TO EFFICIENTLY OBTAIN LOCATION INFORMATION FROM A LOCATION MANAGEMENT ENTITY (71) Applicant: Telefonaktiebolaget L M Ericsson (publ), Stockholm (SE)

(72) Inventors: Roland Gustafsson, Bengtsfors (SE); Jesus-Angel De-Gregorio-Rodriguez, Madrid (ES); Magnus Olsson, London (GB); Yong Yang, Kallered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/484,946

(22) Filed: Sep. 12, 2014

(65) Prior Publication Data

US 2015/0080022 A1 Mar. 19, 2015

Related U.S. Application Data (63) Continuation of application No. PCT/EP2014/068795, filed on Sep. 4, 2014.

(60) Provisional application No. 61/877,541, filed on Sep. 13, 2013.

(51) Int. Cl.
*H04W 64/00* (2009.01)
*H04W 8/10* (2009.01)
*H04W 68/02* (2009.01)

(52) U.S. Cl.
CPC .............. *H04W 64/00* (2013.01); *H04W 8/10* (2013.01); *H04W 68/02* (2013.01)

(58) Field of Classification Search
None
See application file for complete search history.

(56) References Cited

U.S. PATENT DOCUMENTS

| 2001/0009544 | A1* | 7/2001 | Vanttinen | H04W 64/00 370/338 |
| 2005/0037803 | A1* | 2/2005 | Friman | H04W 68/00 455/552.1 |
| 2010/0041418 | A1 | 2/2010 | Edge et al. | |
| 2014/0126504 | A1* | 5/2014 | Jung | H04L 5/0037 370/329 |
| 2015/0131544 | A1* | 5/2015 | Behravan | H04W 48/08 370/329 |

FOREIGN PATENT DOCUMENTS

EP 2723130 A2 4/2014
WO 2013120506 A1 8/2013

OTHER PUBLICATIONS

"3rd Generation Partnership Project; Technical Specification Group Services and System Aspects; Functional stage 2 description of Location Services (LCS) (Release 11)", 3GPP Standard; 3GPP TS 23.271, 3rd Generation Partnership Project (3GPP), Mobile Competence Centre; 650, Route Des Lucioles; F-06921 Sophia-Antipolis Cedex; France, vol. SA WG2, No. V11.2.0, Mar. 5, 2013, pp. 1-169, XP050691817.
International Search Report issued on Nov. 25, 2014 in International Application No. PCT/EP2014/068795, 8 pages.

* cited by examiner

*Primary Examiner* — Diane Mizrahi
(74) *Attorney, Agent, or Firm* — Rothwell, Figg, Ernst & Manbeck, P.C.

(57) ABSTRACT

In one aspect there is provided a method performed by a first location management entity, LME (e.g., an MME or an SGSN), for providing location information to a location server (e.g., a GMLC). The method includes the first LME receiving from the location server a first request for location information pertaining to a terminal. The method also includes the first LME determining whether the terminal is in a connected state. The method further includes the first LME, in response to determining that the terminal is in a connected state, performing a method comprising: i) transmitting a stop paging message to a second LME; ii) obtaining the requested location information pertaining to the terminal; and iii) transmitting the obtained location information to the location server.

12 Claims, 11 Drawing Sheets

SYSTEMS AND METHODS FOR A LOCATION SERVER TO EFFICIENTLY OBTAIN LOCATION INFORMATION FROM A LOCATION MANAGEMENT ENTITY

CROSS-REFERENCE TO RELATED APPLICATIONS

This application claims the benefit of provisional patent application No. 61/877,541 filed on Sep. 13, 2013; this application is a continuation of international patent application no. PCT/EP2014/068795, filed on Sep. 4, 2014. The above-identified applications are incorporated by reference herein.

TECHNICAL FIELD

The present invention relates to system and methods for a location server to efficiently obtain location information from a location management entity.

BACKGROUND

A location server, such as a Gateway Mobile Location Center (GMLC), functions to provide location information pertaining to a communication device (a.k.a., "terminal" or "user equipment (UE)") to a client requesting the information. Under the 3GPP standard (TS23.271 Functional stage 2 description of Location Services (LCS)), the GMLC requests routing information from a Home Location Registry/Home Subscriber Server (HLR/HSS), which routing information is used by the GMLC to request location information identifying the location of a terminal from a location management entity, such as a Mobility Management Entity (MME) or a Serving Gateway Support Node (SGSN), that is handling the terminal.

If the terminal has been camping on both E-UTRAN and UTRAN/GERAN, then the HSS/HLR may respond to GMLC with routing information for both an MME and an SGSN. This routing information does not contain any information about the RAT in which the terminal is located, nor does the routing information include information identifying the connection state the of user terminal (e.g., if the terminal is in connected or idle state). Accordingly, the GMLC will not know in which RAT the terminal is camping and, thus, it may send the location request to any of the SGSN or the MME, which may result in a Radio Access Network (RAN) (e.g., E-UTRAN) paging the terminal even though the terminal is already connected to another RAN (e.g., UTRAN/GERAN), which is inefficient and wastes resources.

SUMMARY

This disclosure provides embodiments that reduce such inefficiencies. Advantages of the embodiments include: (1) reducing the amount of signaling between the GMLC and the SGSN/MME; (2) reducing unsuccessful or wasteful terminal paging; and (3) increasing the response rate of the GMLC (e.g., the GMLC is able to obtain the requested location information more quickly).

In particular, in one aspect there is provided a method performed by a first location management entity, LME (e.g., an MME or an SGSN), for providing location information to a location server (e.g., a GMLC). The method includes the first LME receiving from the location server a first request for location information pertaining to a terminal. The method also includes the first LME determining whether the terminal is in a connected state. The method further includes the first LME, in response to determining that the terminal is in a connected state, performing a method comprising: i) transmitting a stop paging message to a second LME; ii) obtaining the requested location information pertaining to the terminal; and iii) transmitting the obtained location information to the location server.

In some embodiments, the first LME is configured such that, in response to determining that the terminal is not in a connected state, the first LME: determines whether it has received a stop paging method from the second LME; and pages the terminal in response to determining that the first LME has not received a stop paging message from the second LME.

In some embodiments, the method also includes the first LME receiving from the location server a second request for location information pertaining to a second terminal. As a result of receiving the second request, the first LME pages the second terminal. The first LME then receives a stop paging message from the second LME and the first LME ceases paging of the second terminal in response to receiving the stop paging message.

In some embodiments, the step of obtaining the requested location information pertaining to the terminal comprises the first LME transmitting a message to a Serving Mobile Location Centre, SMLC, or an evolved SMLC, E-SMLC; and the first LME receiving a response message from the SMLC or the E-SMLC, the response message comprising the location information pertaining to the terminal.

In another aspect a computer system is provided. The computer system is configured to determine whether a terminal is in a connected state in response to receiving from a location server a request for location information pertaining to the terminal. The computer system is further configured, such that, in response to determining that the terminal is in a connected state, the computer system performs a method comprising: i) transmitting a stop paging message to a location management entity, LME; ii) obtaining the requested location information pertaining to the terminal; and iii) transmitting the obtained location information to the location server.

In another aspect there is provided a method performed by a first location management entity, LME, for providing location information to a location server, the first LME being connected to a first radio access network, RAN. The method includes the first LME receiving from the location server a request for location information pertaining to a terminal. The method also includes the first LME determining whether the terminal is in a connected state in the first RAN. The method further includes the first LME, in response to determining that the terminal is not in a connected state in the first RAN, performing a method comprising: transmitting a location request to a second LME connected to a second RAN; and receiving from the second LME a response message containing state information identifying a state of the terminal in the second RAN.

In some embodiments, the method also includes: determining, based on the state information, whether the terminal is in an idle state in the second RAN; and in response to determining that the terminal is in the idle state in the second RAN, paging the terminal.

In some embodiments, the method also includes determining whether the terminal is in a connected state in the first RAN after paging the terminal; and, in response to determining that the terminal is in the connected state in the first RAN, sending a stop paging message to the second LME.

In some embodiments, the method also includes receiving a stop paging message transmitted by the second LME after paging the terminal; and ceasing paging the terminal in response to receiving the stop paging message.

In another aspect, a computer system is provided, wherein the computer system is configured to determine a connection state of a terminal in a first radio access network, RAN, in response to receiving from a location server a request for location information pertaining to the terminal. The computer system is further configured to perform a particular method in response to determining that the connection state of the terminal indicates that the terminal is not in a connected state in the first RAN. This method comprises: transmitting a location request to a location management entity, LME; and receiving from the LME a response message containing information identifying a connection state of the terminal in a second RAN.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
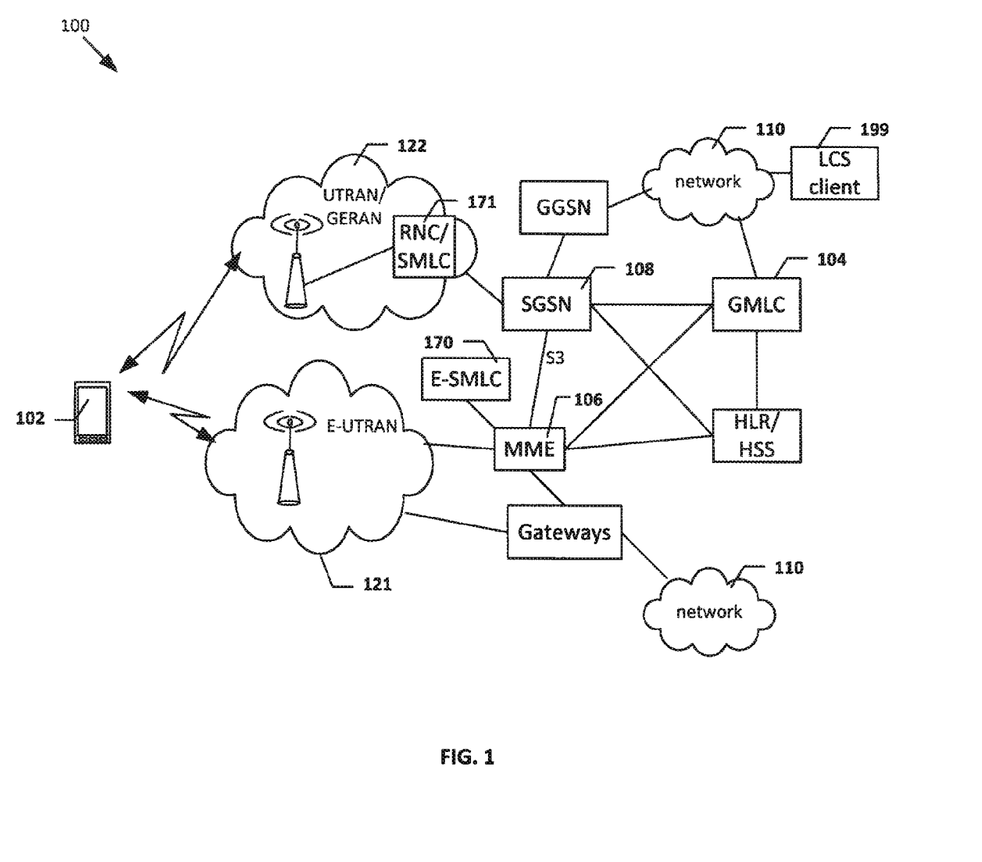
FIG. 1 illustrates a system according to some embodiments.

Referring now to FIG. 1, FIG. 1 illustrates a system 100 according to some embodiments. System 100 is a wireless communication system that enables a wireless communication device 102 to access a network 110, such as the Internet or other network. Communication device 102 is also referred to as terminal 102. A location service (LCS) client 199 (e.g., a third-party app) may desire to know the location of terminal 102. Accordingly, system 100 includes a location server 104, which, in the embodiment shown, is a GMLC 104.

As described in the background section above, when an entity requests information identifying the location of terminal 102, the GMLC 104 may send a location request message to a location management entity (LME) that is responsible for managing terminal 102, which LME is connected to a RAN in which the terminal may be found (in the example system 100 shown in FIG. 1, system 100 includes two LMEs: an MME 106 connected to RAN 121 (e.g., E-UTRAN) and a SGSN 108 connected to a RAN 122 (e.g., UTRAN/GERAN)). The LME, in response to receiving the location request message from the GMLC, may cause the RAN to start paging the terminal 102 so that the terminal can transition from an idle state to a connected state (e.g., so that a Radio Resource Control (RRC) connection may be established between terminal 102 and a network node (e.g., an eNodeB or an RNC)). As further described in the background section, such paging may be unnecessary when the terminal 102 is already connected to a RAN. Accordingly, described herein are steps performed by various entities of system 100 that reduce the likelihood that an LME will unnecessarily page terminal 102.

Figure 2:
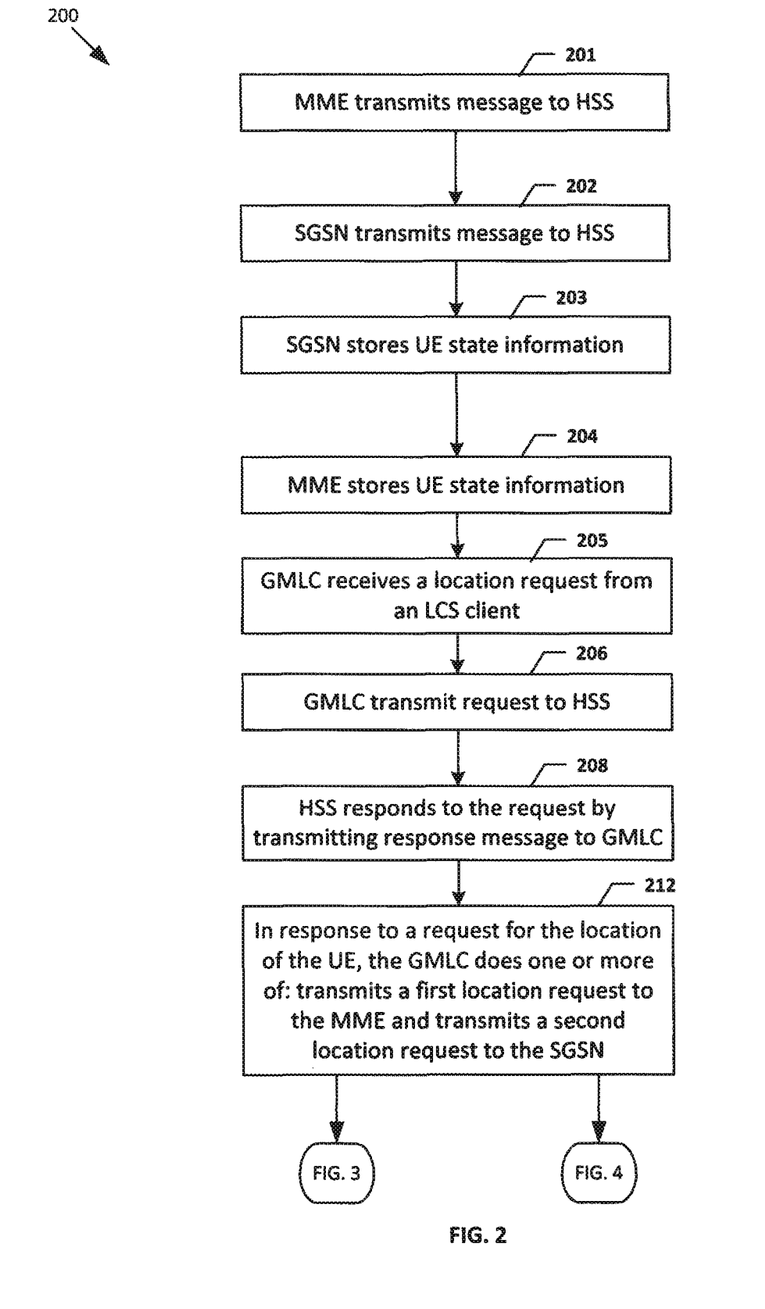
FIG. 2 is a flow chart illustrating a process according to some embodiments.
Figure 5:
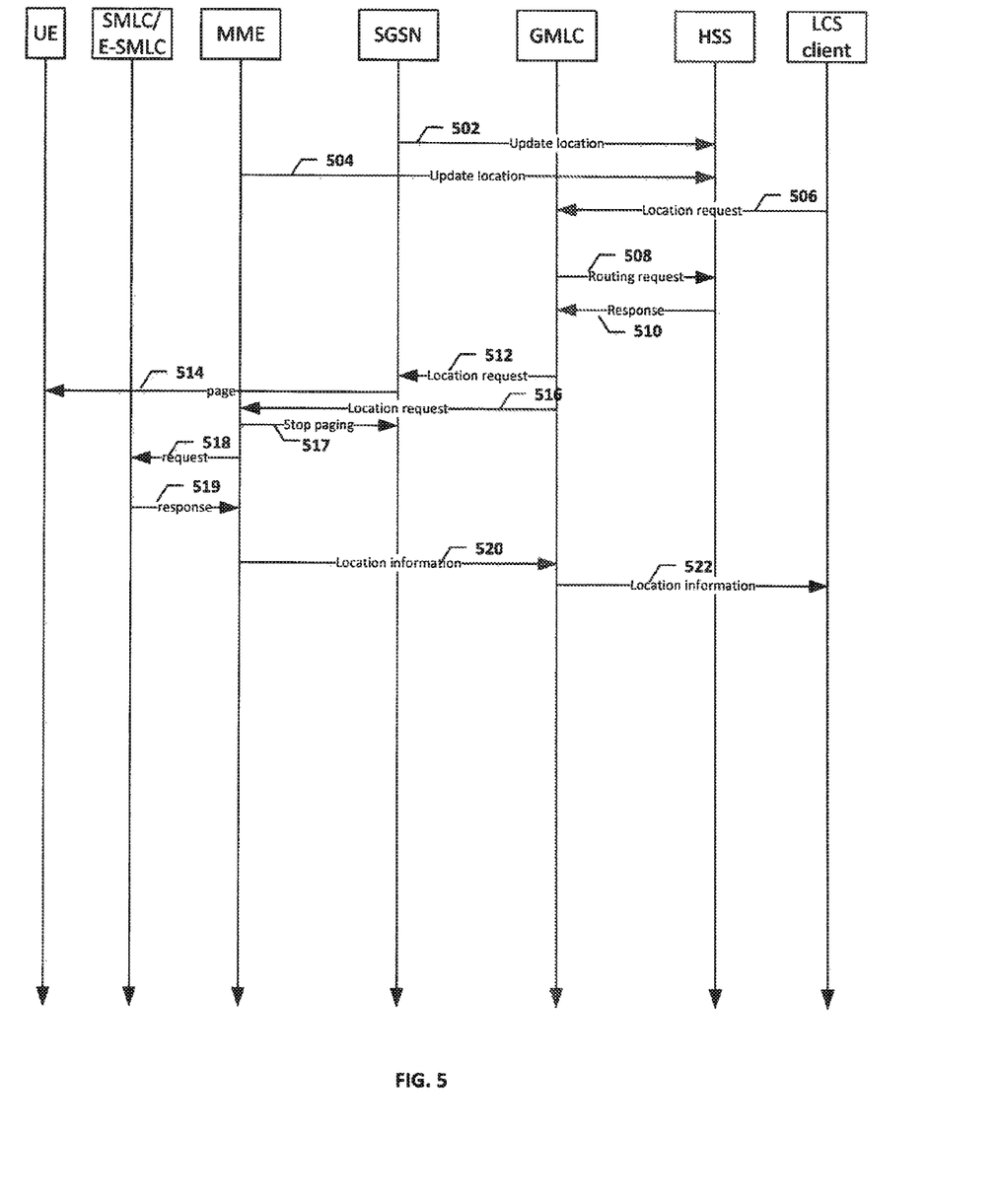
FIG. 5 is a message flow diagram, according to various embodiments, in the case where the UE is in connected mode in the E-UTRAN/MME access when the location requests are sent from the GMLC.

Referring now to FIG. 2, FIG. 2 is a flow chart illustrating a process 200 according to some embodiments. Process 200 may begin in step 201, where the MME 106 transmits a message 504 (e.g., an Update location message) (see the message flow diagram shown in FIG. 5) to the HSS. In some embodiments, the MME transmits message 504 as a result of receiving from RAN 121 (e.g., an eNodB of RAN 121) an attach request message indicating that terminal 102 has transmitted an attach request to RAN 121. Additionally, the MME may transmit message 504 as a result of receiving from RAN 121 a tracking area update (TAU) request message indicating that terminal 102 has transmitted such a message to RAN 121. The message 504 may contain at least one or more of: an address for an interface of the MME (the address may be an IP address or a hostname (or other identifier) that can be used to look-up an IP address), the MME's identity (which, in some embodiments, may be used to look-up an IP address for the MME), information indicating that the MME supports signaling of location information over the S3 interface (an interface between MME and SGSN), and an identity of terminal 102 (e.g. ME identity). In some embodiments, the MME includes the address in message 504 only if the MME's address for the S3 interface is different than the MME's address for the S6a/d interface.

In step 202, the SGSN 108 transmits a message 502 (e.g., an Update location message) to the HSS. In some embodiments, the SGSN transmits message 502 as a result of receiving from RAN 122 an attach request message indicating that terminal 102 has transmitted an attach request to RAN 122. Additionally, the SGSN may transmit message 502 as a result of receiving from RAN 121 a routing area update (RAU). The message 502 may contain at least one or more of: an address for an interface of the SGSN (the address may be an IP address or a hostname (or other identifier) that can be used to look-up an IP address), the SGSN's number (which, in some embodiments, may be used to look-up an IP address for the SGSN), information indicating that the SGSN supports signaling of location information over the S3 interface, and an identity of terminal 102. In some embodiments, the SGSN includes the address in message 502 only if the SGSN's address for the S3 interface is different than the SGSN's address for the S6a/d interface.

In step 203, the SGSN stores state information identifying the current connection state of terminal 102 with respect to RAN 122. In step 204, the MME stores state information identifying the current connection state of terminal 102 with respect to RAN 121.

In step 205, the GMLC receives a location request message 506 (e.g., an LCS Service Request) from an LCS client (e.g., client 199), which request message 506 requests location information pertaining to terminal 102 (e.g. terminal 102's current location, terminal 102's velocity, and/or other location information). The request message 506, therefore, may include at the least an identity of terminal 102 or information for determining an identity of terminal 102 (e.g., information that enables the GMLC to determine the terminal 102's MSISDN or IMSI).

In step 206, in response to receiving location request message 506, the GMLC transmits a request message 508 (e.g., a Routing request message) to the HSS.

In step 208, the GLMC receives a response message 510 from HSS sent in response to the request message 508. In some embodiments, response message 510 includes: an address for the SGSN (e.g., the address included in message 502), an address for the MME (e.g., the address included in message 504), information indicating that the SGSN supports signaling of location information over the S3 interface, and information indicating that the MME supports signaling of location information over the S3 interface.

In step 212, as a result of receiving the response 510, the GMLC does one or more of (a) transmits a first location request 516 (e.g., a first Subscriber Location Request message) to the MME and (b) transmits a second location request 512 (e.g., a second Subscriber Location Request message) to the SGSN. The location requests 512/516 may contain at least one or more of the following pieces of information: the identity of terminal 102 (e.g., MSISDN, IMSI, IMEI, etc.); information about the LCS client 199 requesting the location of terminal 102; details about the location information being requested (e.g., current location, velocity); QoS information (e.g. accuracy, response time). Additionally, message 512 may include information to enable the SGSN to communicate with the MME over the S3 interface (e.g., this information may include the MME's address included in message 510); and message 516 may include information to enable the MME to communicate with the SGSN over the S3 interface (e.g., this information may include the SGSN's address included in message 510).

Figure 3:
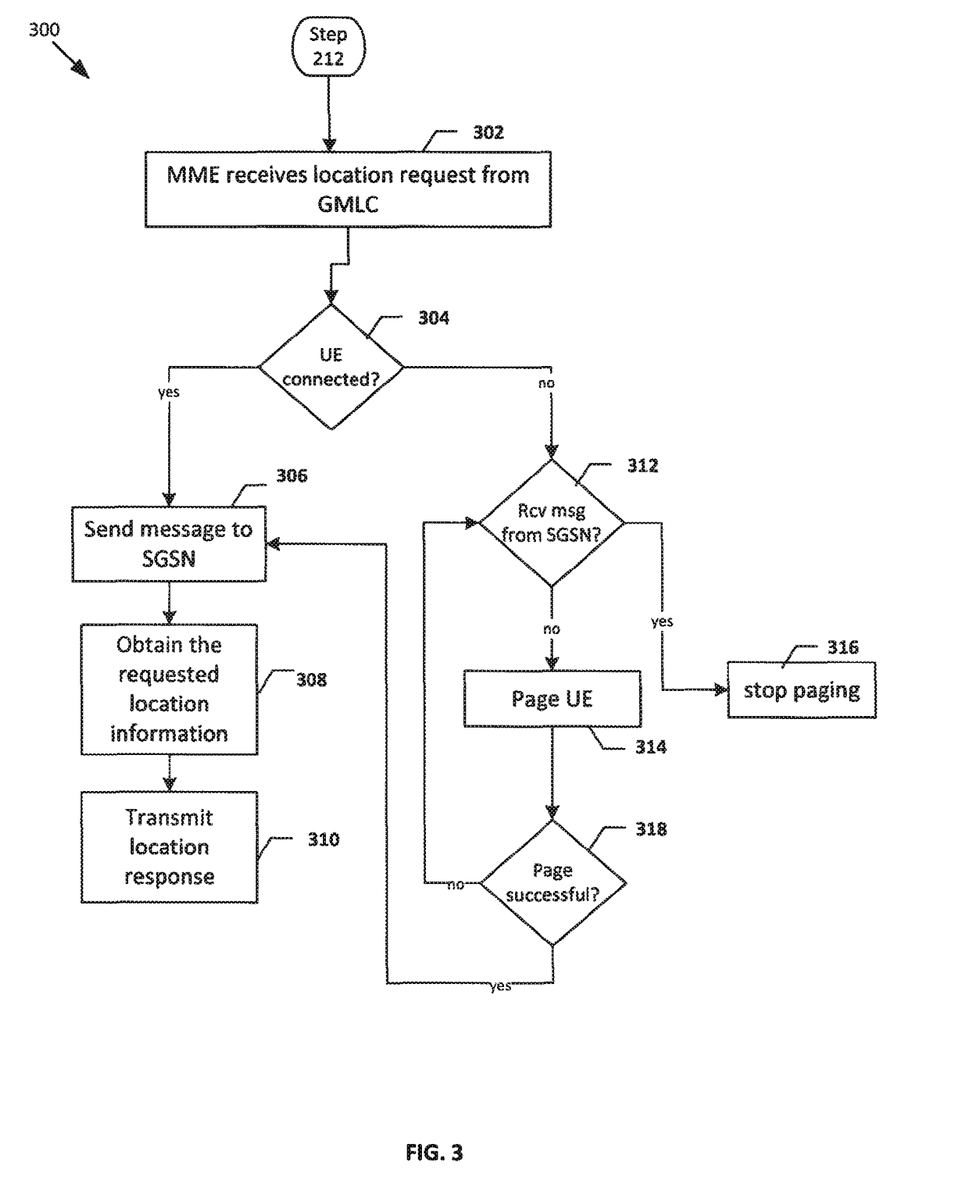
FIG. 3 is a flow chart illustrating a process according to some embodiments.

FIG. 3 is flow chart illustrating a process 300, according to some embodiments, performed by the MME when the GLMC transmits to the MME the location request 516 requesting location information pertaining to terminal 102. Process 300 may begin in step 302, where the MME receives the location request 516 from GMLC. In response, the MME determines whether the terminal 102 is in a connected state. If the terminal 102 is in the connected state, then the process may proceed to steps 306-310, otherwise it may proceed to steps 312-318.

In step 306, the MME sends a stop paging message 517 to the SGSN.

In step 308, the MME obtains the requested location information for terminal 102. For example, in step 308, the MME may transmit to the Evolved Serving Mobile Location Centre (E-SMLC) 170 a request message 518 requesting location information for terminal 102, and, in response, receive from the E-SMLC a response message 519 containing the requested information (e.g., current location of the terminal, the velocity of the terminal, etc.).

In step 310, after obtaining the location information for terminal 102, the MME transmits to the GMLC a location response message 520 containing the location information requested by the GMLC (e.g., containing at least some of the location received from the SMLC).

Figure 6:
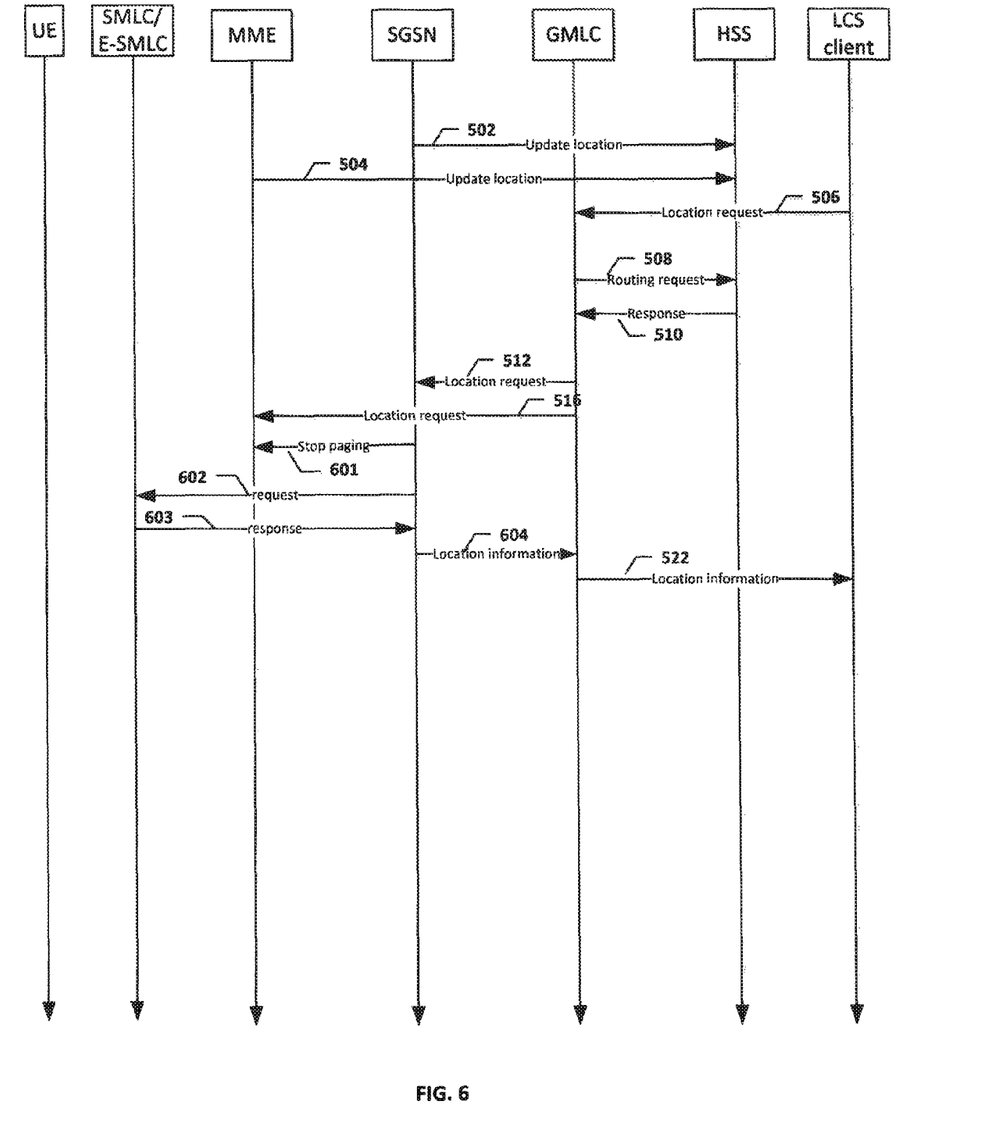
FIG. 6 is a message flow diagram, according to various embodiments, in the case where the UE is in connected mode in the UTRAN/SGSN access when the location requests are sent from the GMLC.
Figure 7:
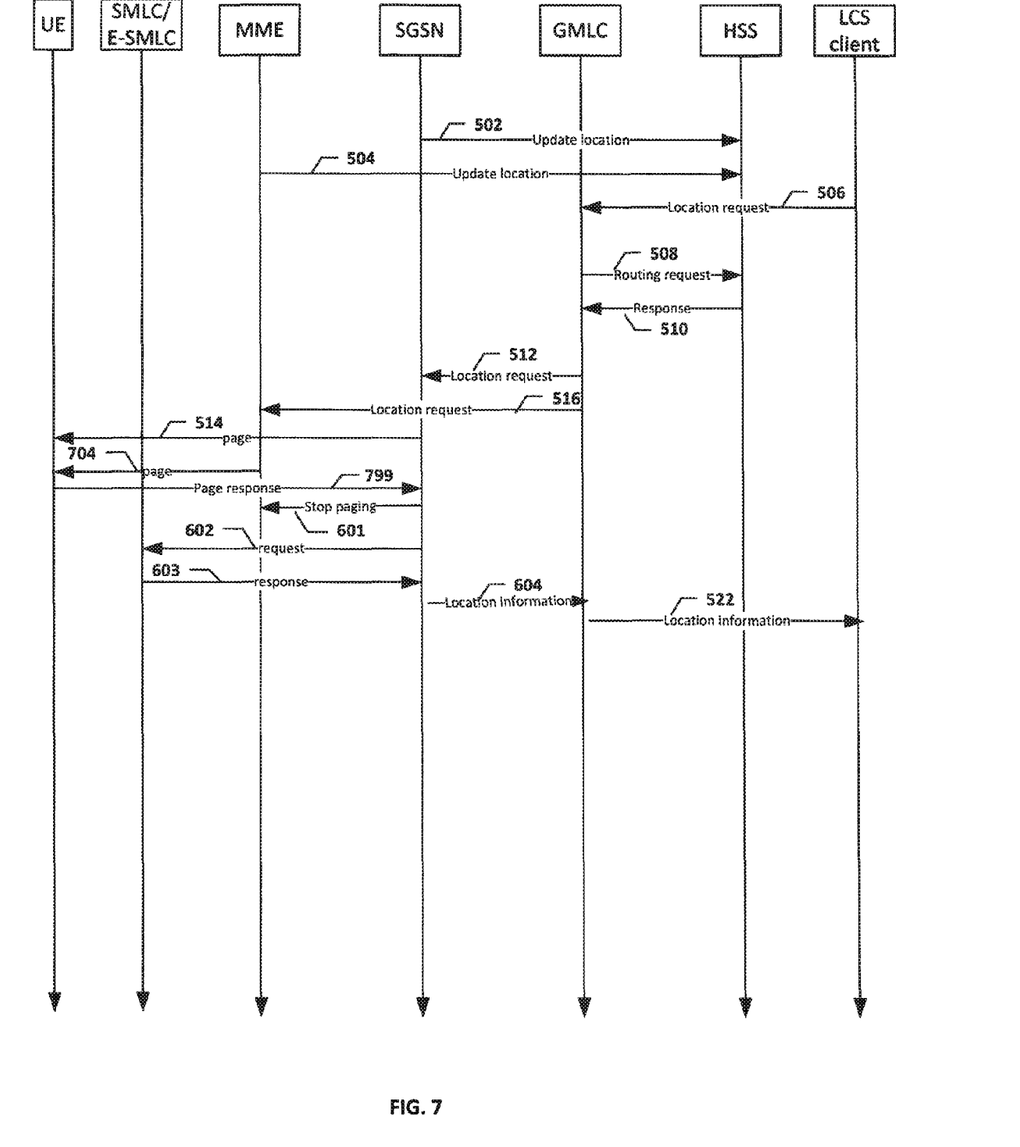
FIG. 7 is a message flow diagram, according to various embodiments, in the case where, when the location requests are sent from the GMLC, the UE is not in the connected mode in the UTRAN/SGSN access and also is not in the connected mode in the E-UTRAN/MME access (e.g., the UE is in idle mode)—as shown in FIG. 7, after being paged, the UE is in the connected mode in the UTRAN/SGSN access.
Figure 10:
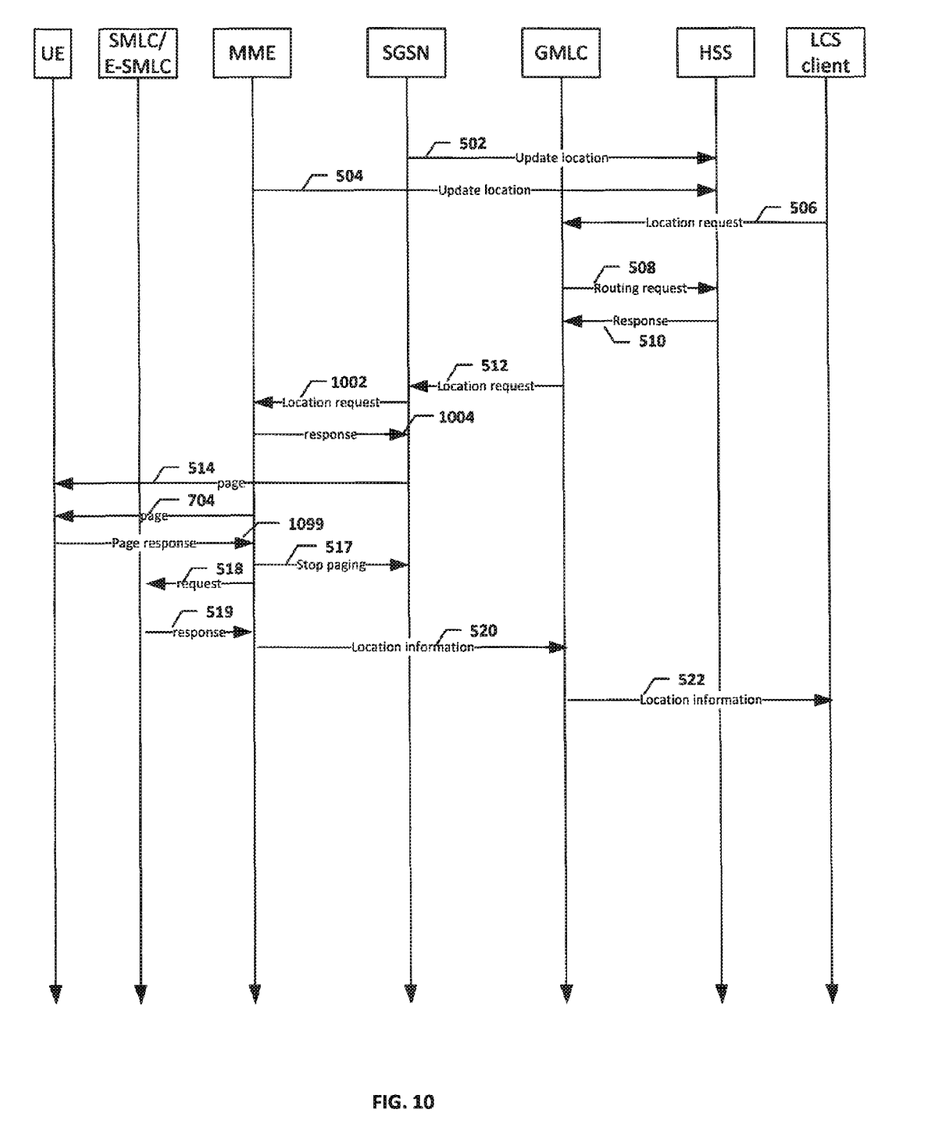
FIG. 10 is a message flow diagram, according to some embodiments, for the case where, when the single location request is sent from the GMLC, the UE is not in the connected mode in the UTRAN/SGSN access and also is not in the connected mode in the E-UTRAN/MME access (e.g., the UE is in idle mode)—as shown in FIG. 10, after being paged, the UE is in the connected mode in the E-UTRAN/MME access.

In step 312, the MME determines whether it has received a stop paging message 601 (see FIG. 6). If so, then it stops paging the terminal (or does not start paging the terminal) (step 316). Otherwise, the MME pages the terminal (step 314) (see FIG. 7, page 704, FIG. 10, page 704). It step 318, it determines whether the paging is successful (e.g., it determines whether the terminal is now connected to RAN 121—i.e., in a connected state in RAN 121. If the paging is successful, then the MME would have received a page response 1099 (see FIG. 10) (e.g., a service request message) and the process proceeds to steps 306-310, otherwise it proceeds back to step 312.

Figure 4:
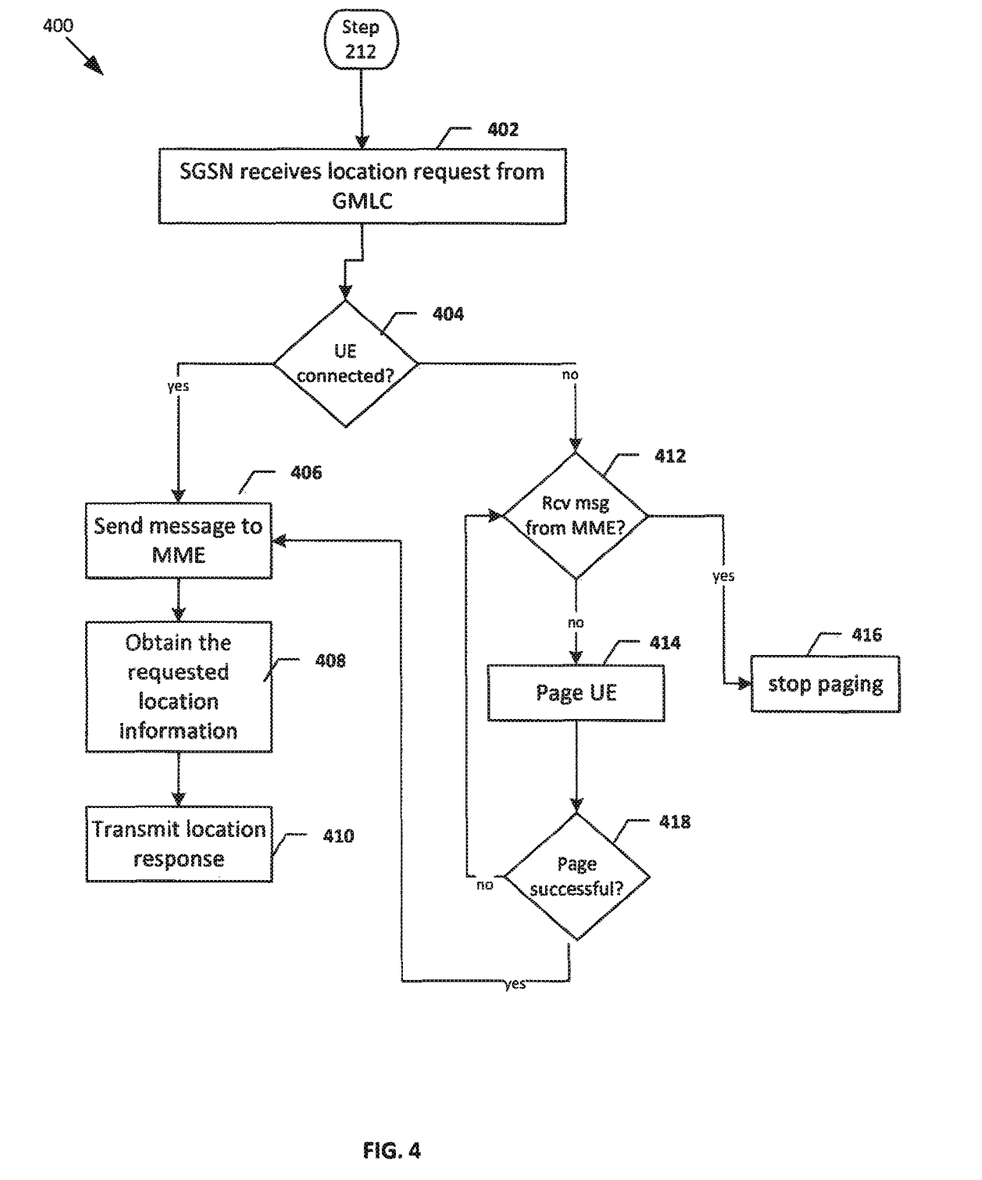
FIG. 4 is a flow chart illustrating a process according to some embodiments.

FIG. 4 is flow chart illustrating a process 400, according to some embodiments, performed by the SGSN when the GLMC transmits the location request 512 to the SGSN. Process 400 may begin in step 402, where the SGSN receives the location request 512 from GMLC. In response, the SGSN determines whether the terminal 102 is in a connected state. If the terminal 102 is in the connected state, then the process may proceed to steps 406-410, otherwise it may proceed to steps 412-418.

In step 406, the SGSN sends a stop paging message 601 to the MME.

In step 408, the SGSN obtains the requested location information for terminal 102. For example, in step 408, the SGSN may transmit to the Serving Mobile Location Centre (SMLC) 171 a request message 602 requesting location information for terminal 102, and, in response, receive from the SMLC a response message 603 containing the requested information (e.g., current location of the terminal, the velocity of the terminal, etc.).

In step 410, after obtaining the location information for terminal 102, the SGSN transmits to the GMLC a location response message 604 (see FIG. 6) containing the location information requested by the GMLC (e.g., containing at least some of the location received from the SMLC).

In step 412, the SGSN determines whether it has received a stop paging message 517. If so, then it stops paging the terminal (or does not start paging the terminal) (step 416). Otherwise, the SGSN pages the terminal (step 414) (see FIG. 5, page 514). In step 418, it determines whether the paging is successful (e.g., it determines whether the terminal is now connected to RAN 121). If the paging is successful, then the SGSN would have received a page response 799 (see FIG. 7) (e.g., a service request message) and the process proceeds to steps 406-310, otherwise it proceeds back to step 412.

After the GMLC receives message 520 or 604, each of which contains the requested location information, the GMLC may send to the requesting LCS client a location response message 522 containing the location information from message 520 or 604.

Figure 8:
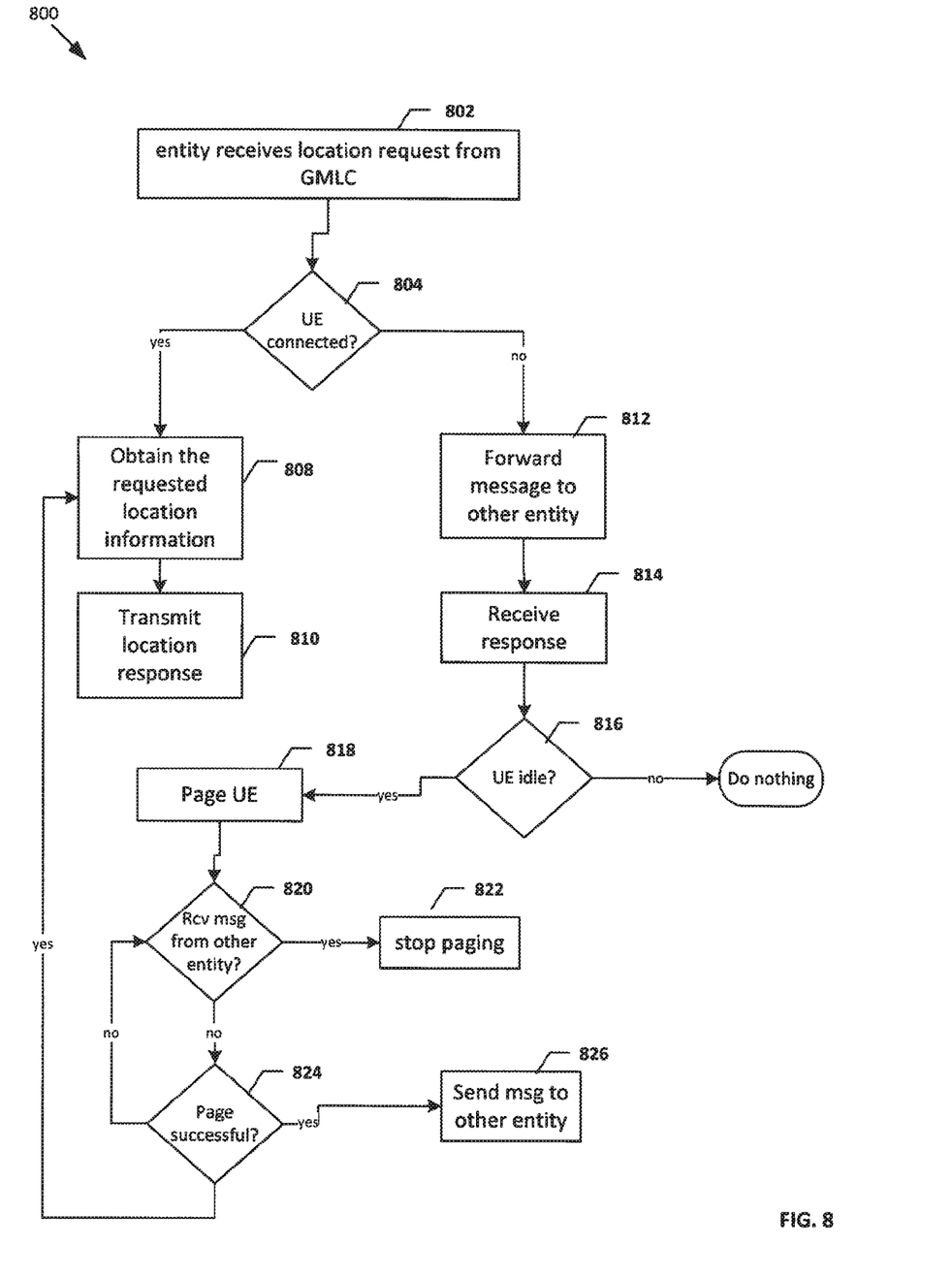
FIG. 8 is a flow chart illustrating a process according to some embodiments.

Referring now to FIG. 8, FIG. 8 illustrates a process 800 according to an alternative embodiment (an embodiment in which GMLC transmits a location request to only one of the MME or SGSN, not both). Process 800 may be performed by a location management entity (LME) (e.g., the MME or the SGSN). For the sake of illustration, we shall assume that the process is performed by an SGSN (i.e., the GMLC has sent the request to the SGSN, not the MME).

In step 802, the SGSN receives the location request message 512. In step 804, the SGSN determines whether terminal 102 is connected to RAN 122. If so, then the process proceeds to step 808, otherwise it proceeds to step 812.

In step 808, the SGSN obtains the requested location information for terminal 102 and then transmits to the GMLC the location response 604.

In step 812, the SGSN sends a location request 1002 (see FIG. 10) to the MME. In step 814 it receives from the MME a response 1004 to the request message 1002. Using the information in the response 1004, the SGSN determines whether the terminal is connected to RAN 121. If it is connected to RAN 121, then the SGSN need take no further action with respect to the location request 512. If the terminal is not connected to RAN 121 (e.g., it is in an idle state), then process 800 proceeds to step 818-826.

In step 818, the SGSN pages the terminal. In step 820, the SGSN determines whether it has received a stop paging message 517. If so, then it stops paging the terminal (step 822). Otherwise (step 824), the SGSN determines whether the paging is successful (e.g., it determines whether the terminal is now connected to RAN 122). If the paging is successful, the process proceeds to steps 808-810 and the SGSN transmits a message 601 to the MME.

Figure 9:
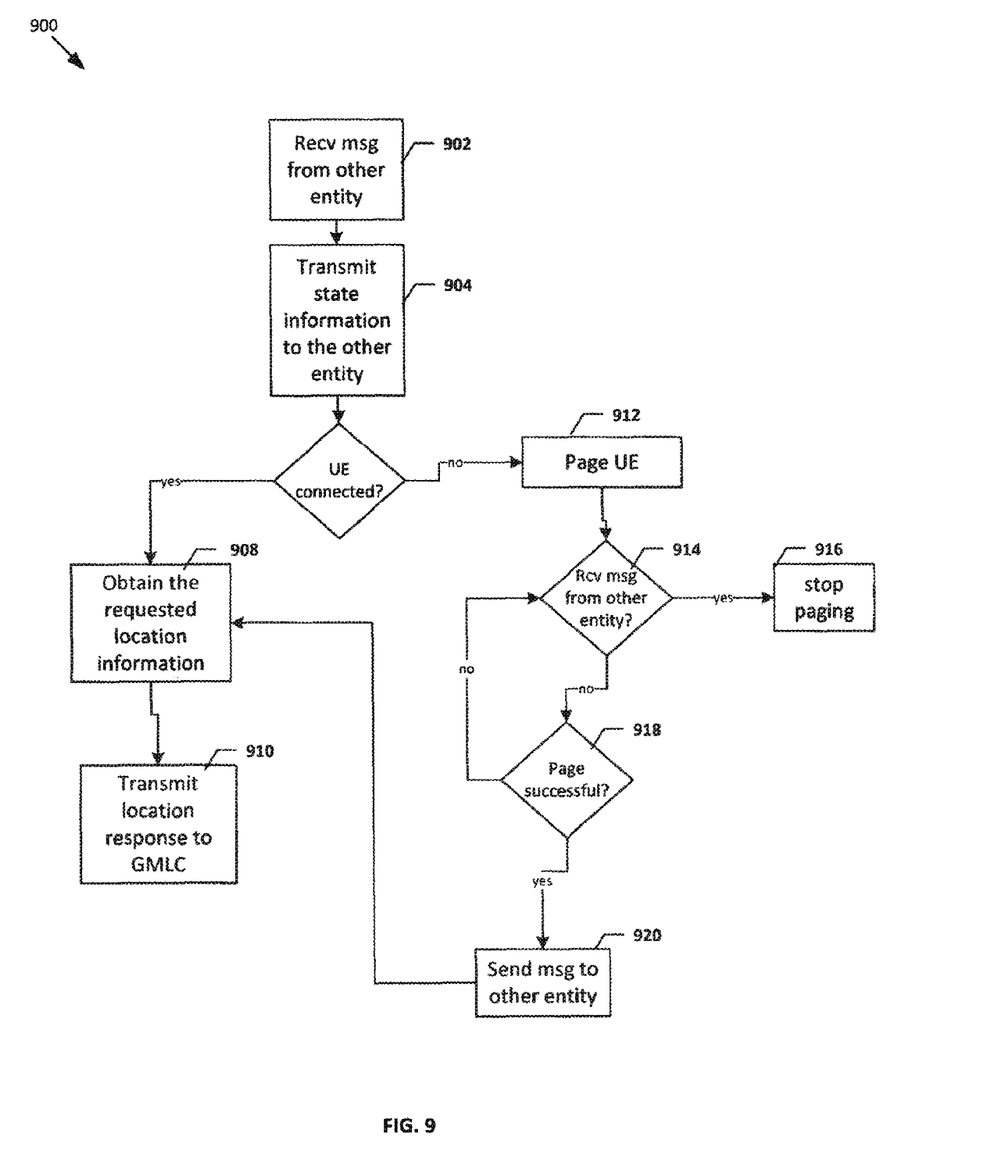
FIG. 9 is a flow chart illustrating a process according to some embodiments.

FIG. 9 is a flow chart illustrating a process 900 performed by an LME where the LME receives a location request from another LME, as opposed to receiving the location request directly from the GMLC. For the sake of illustration and continuing with the example above, we shall assume that process 900 is performed by the MME (i.e., the GMLC transmits a location request to the SGSN, which then may transmit a location request to the MME—see step 812).

Process 900 may begin in step 902, where the MME receives the location request message 1002. In step 904 it transmit the response 1004 to the SGSN. The response message 1004 contains information identifying whether the terminal 102 is connected to RAN 121. If the terminal 102 is connected to RAN 121, then the process proceeds to steps 908-910, otherwise it proceeds to steps 912-918. In step 908, the MME obtains the requested location information for terminal 102, and in step 910, the MME transmits the location response 520 to the GMLC. In step 912, the MME pages the terminal 102. In step 914 the MME determines whether it has received a stop paging message 601. If so, then it stops paging the terminal (step 916). Otherwise (step 918), the MME determines whether the paging is successful (e.g., it determines whether the terminal is now connected to RAN 121). If the paging is successful, the process proceeds to steps 920. In step 920, the MME sends the stop paging message 517 to the SGSN to cause the SGSN to cease paging the terminal. After step 920, the process proceeds to steps 908-910, described above.

Figure 11:
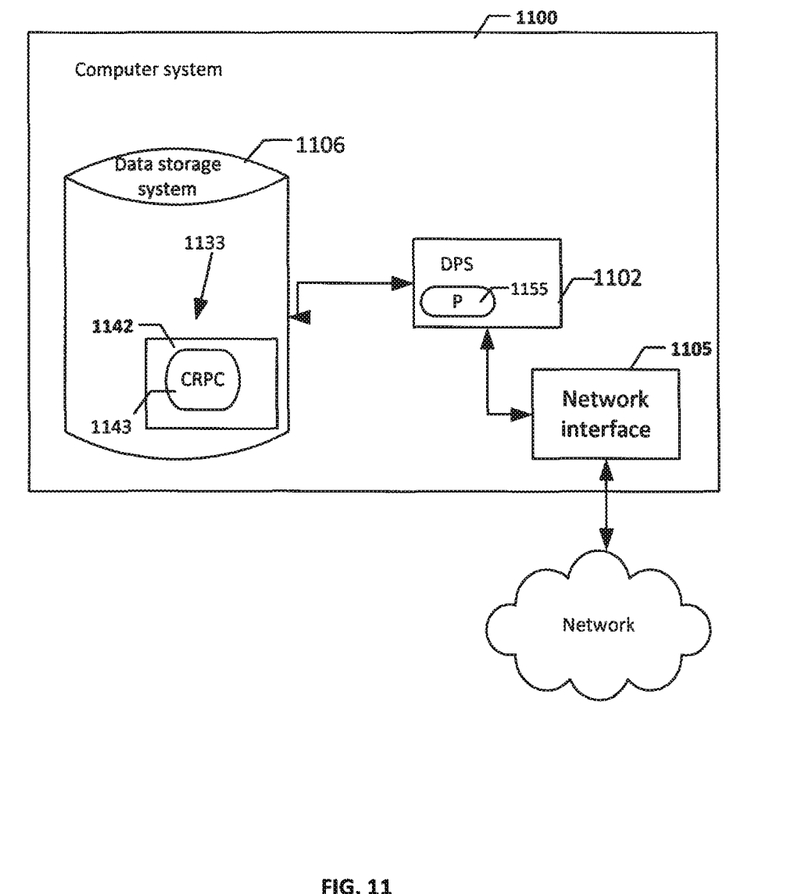
FIG. 11 is a block diagram of a computer according to some embodiments.

Each entity described herein (e.g., MME, SGSN, GMLC, etc.) may be a software entity that is executed by a computer system. FIG. 11 is a block diagram of a computer system 1100 that may be used to execute one or more of the entities described herein.

As shown in FIG. 11, computer system 1100 includes: a data processing system (DPS) 1102, which may include one or more processors (P) 1155 (e.g., microprocessors) and/or one or more circuits, such as an application specific integrated circuit (ASIC), Field-programmable gate arrays (FPGAs), etc.; a network interface 1105 for receiving messages from, and transmitting messages to, various nodes of network 100; a data storage system 1106, which may include one or more computer-readable data storage mediums, such as a non-transitory memory unit (e.g., hard drive, flash memory, optical disk, etc.) and/or volatile storage apparatuses (e.g., dynamic random access memory (DRAM)). In embodiments where data processing system 1102 includes a processor 1155 (e.g., a microprocessor), a computer program product 1133 may be provided, which computer program product includes: computer readable program code (CRPC) 1143 (e.g., instructions), which implements a computer program, stored on a non-transitory computer readable medium 1142 of data storage system 1106, such as, but not limited, to magnetic media (e.g., a hard disk), optical media (e.g., a DVD), memory devices (e.g., random access memory), etc. In some embodiments, computer readable program code 1143 is configured such that, when executed by data processing system 1102, code 1143 causes the data processing system 1102 to perform steps described herein (e.g., steps shown in FIGS. 2-4, 8 and 9).

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first location management entity (LME) for providing location information to a location server, comprising:
   the first LME receiving from the location server a first request for location information pertaining to a terminal;
   the first LME determining whether the terminal is in a connected state; and
   the first LME, in response to determining that the terminal is in a connected state, performing a method comprising:
   transmitting a stop paging message to a second LME;
   obtaining the requested location information pertaining to the terminal; and
   transmitting the obtained location information to the location server.

2. The method of claim 1, wherein the first LME is configured such that, in response to determining that the terminal is not in a connected state, the first LME: determines whether the first LME has received a stop paging message from the second LME; and pages the terminal in response to determining that the first LME has not received a stop paging message from the second LME.

3. The method of claim 1, further comprising:
   the first LME receiving from the location server a second request for location information pertaining to a second terminal;
   the first LME paging the second terminal as a result of receiving the second request for location information pertaining to the second terminal;
   the first LME receiving a stop paging message from the second LME;
   the first LME ceasing paging of the second terminal in response to receiving the stop paging message.

4. The method of claim 1, wherein the first LME is one of: Mobility a Management Entity, MME, and a Serving GPRS Support Node, SGSN.

5. The method of claim 1, wherein the location server is a Gateway Mobile Location Center.

6. The method of claim 1, wherein the step of obtaining the requested location information pertaining to the terminal comprises;
- the first LME transmitting a message to a Serving Mobile Location Centre, SMLC, or an evolved SMLC, E-SMLC; and
- the first LME receiving a response message from the SMLC or the E-SMLC, the response message comprising the location information pertaining to the terminal.

7. A first location management entity (LME) comprising a computer system configured to:
- determine whether a terminal is in a connected state in response to receiving from a location server a request for location information pertaining to the terminal; and
- perform a set of step in response to receiving the request for location information pertaining to the terminal and as a result of determining that the terminal is in a connected state, wherein said set of steps comprises:
  - (1) transmitting to a second LME a stop paging message for causing the second LME to refrain from paging, or cease the paging of, the terminal;
  - (2) obtaining the requested location information pertaining to the terminal; and
  - (3) transmitting the obtained location information to the location server.

8. The first LME of claim 7, wherein the computer system is configured such that, in response to determining that the terminal is not in a connected state, the computer system: determines whether the first LME has received a stop paging message from the second LME; and pages the terminal in response to determining that the first LME has not received a stop paging message from the second LME.

9. The first LME of claim 7, wherein the computer system is further configured to:
- page a second terminal as a result of receiving a request for location information pertaining to the second terminal; and
- cease paging the second terminal in response to receiving a stop paging message from the second LME.

10. The first LME of claim 7, wherein the second LME is one of: a Mobility Management Entity (MME) and a Serving GPRS Support Node (SGSN).

11. The first LME of claim 7, wherein the location server is a Gateway Mobile Location Center.

12. The first LME of claim 7, wherein the step of obtaining the requested location information pertaining to the terminal comprises:
- transmitting a message to a Serving Mobile Location Centre (SMLC) or an evolved SMLC (E-SMLC); and
- receiving a response message from the SMLC or the E-SMLC, the response message comprising the location information pertaining to the terminal.

* * * * *